United States Patent [19]

Kirby et al.

[11] Patent Number: 5,532,034
[45] Date of Patent: Jul. 2, 1996

[54] GETTER SYSTEM FOR VACUUM INSULATION PANEL

[75] Inventors: David B. Kirby, St. Joseph Township, Berrien County; Nihat O. Cur, Royalton Township, Berrien County, both of Mich.

[73] Assignee: Whirlpool Corporation, Benton Harbor, Mich.

[21] Appl. No.: 349,836

[22] Filed: Dec. 6, 1994

[51] Int. Cl.$^6$ ............................................. B32B 1/06
[52] U.S. Cl. ................. 428/69; 428/72; 428/74; 52/406.2; 52/406.3
[58] Field of Search ................ 428/69, 71, 72, 428/74, 76, 913; 52/406.2, 406.3; 156/286

[56] References Cited

U.S. PATENT DOCUMENTS

| | | | |
|---|---|---|---|
| 4,000,246 | 12/1976 | Walles | 423/230 |
| 4,444,821 | 4/1984 | Young et al. | 428/69 |
| 4,668,551 | 5/1987 | Kawasaki et al. | 428/69 |
| 4,726,974 | 2/1988 | Nowobilski et al. | 428/69 |
| 4,745,015 | 5/1988 | Cheng et al. | 428/75 |
| 5,018,328 | 5/1991 | Cur et al. | 52/406 |
| 5,091,233 | 2/1992 | Kirby et al. | 428/69 |
| 5,191,980 | 3/1993 | Boffito et al. | 206/524.4 |
| 5,273,801 | 12/1993 | Barry et al. | 428/69 |
| 5,345,814 | 9/1994 | Cur et al. | 73/49.3 |
| 5,408,832 | 4/1995 | Boffito et al. | 62/451 |

FOREIGN PATENT DOCUMENTS

PCT/IT93/
00007 12/1993 WIPO.

*Primary Examiner*—Alexander S. Thomas
*Attorney, Agent, or Firm*—Hill, Steadman & Simpson

[57] ABSTRACT

A getter system is provided for use with an evacuated container such as a vacuum insulation panel. The getter system has a first, activated getter material capable of gettering at least a first gas or vapor and a second, different gas or vapor. The getter system also has a second, activated getter material capable of gettering the first, but not the second, gas or vapor. Finally, the getter system includes packaging for the first and second getter materials, such that the first and second getter materials may be placed together within a single compartment of the evacuated container and the second getter material will be more readily exposed to the first gas or vapor than the first getter material. In this manner, the first getter material will be protected from the first gas or vapor even though it is already activated.

12 Claims, 3 Drawing Sheets

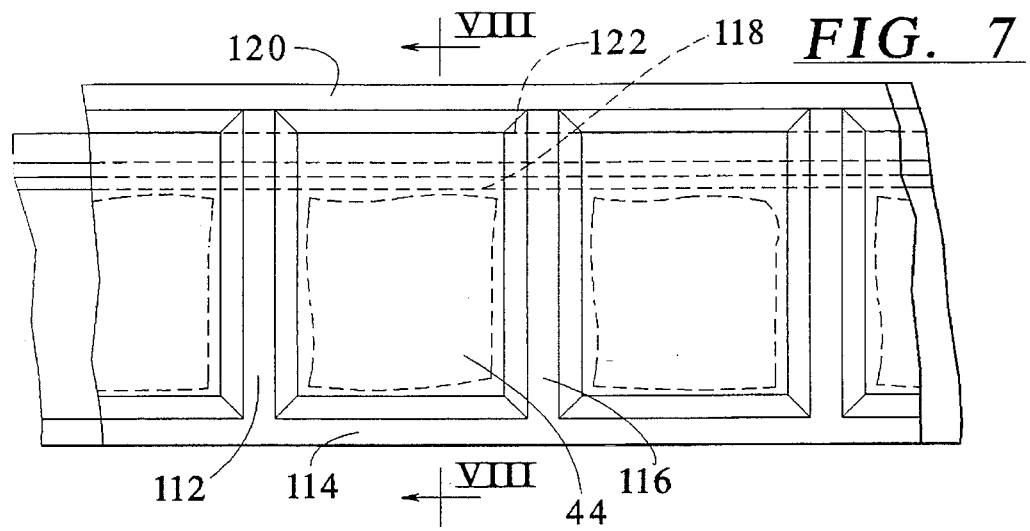
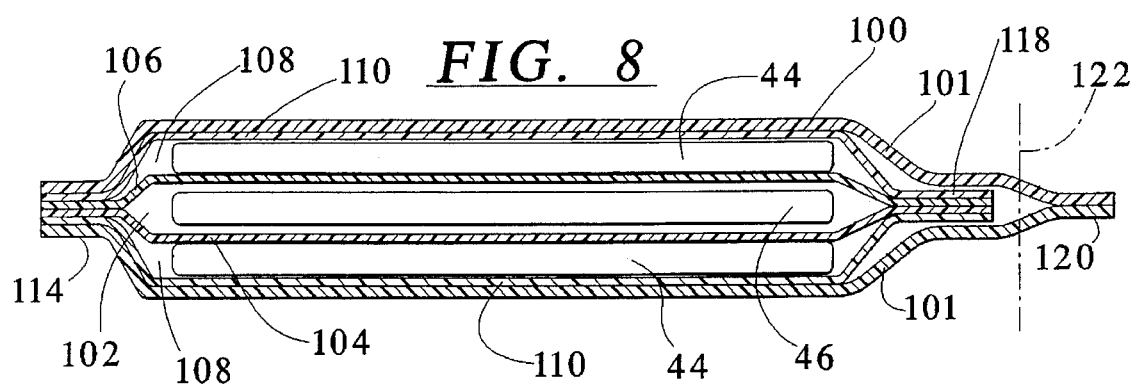
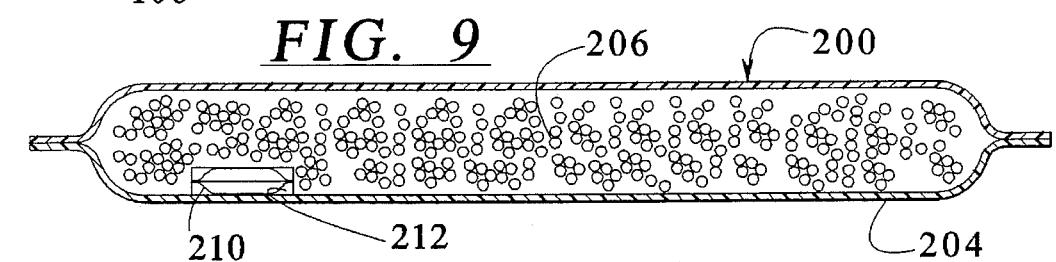
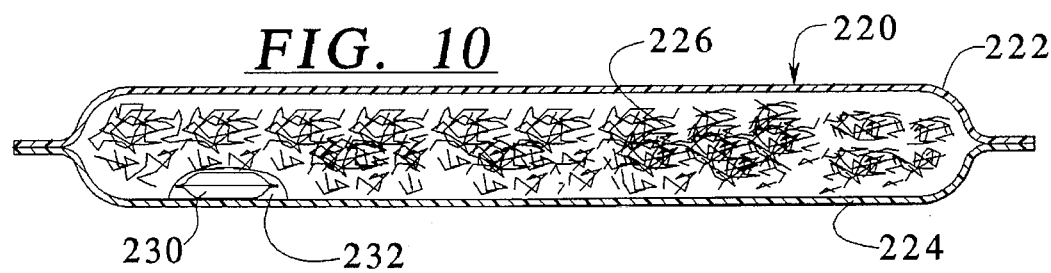
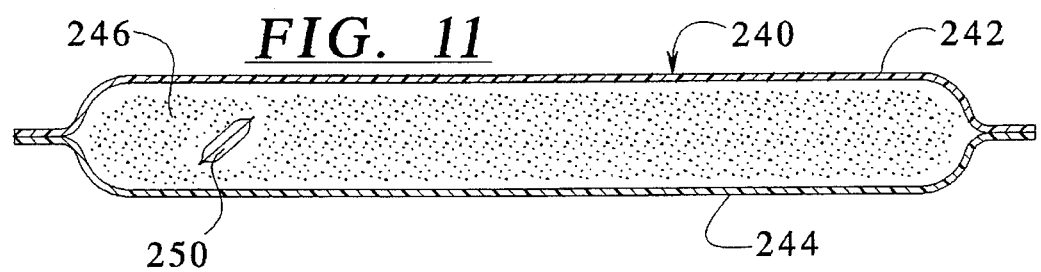

GETTER SYSTEM FOR VACUUM INSULATION PANEL

BACKGROUND OF THE INVENTION

The present invention relates to a gas getter system and more particularly a gas getter system for use with vacuum insulation panels.

Getter materials, that is, materials which absorb or adsorb gases and vapors, including water vapor, are well known and are used in a wide variety of enclosures to continuously absorb various gases and vapors, depending on the particular getter material employed, to either protect the components located within the enclosure or to maintain a certain characteristic of the atmosphere within the enclosure, such as a dry atmosphere or a very low pressure atmosphere. One particular environment in which getter materials are used are vacuum insulation panels.

Vacuum insulation panels are known for various uses including use in refrigeration appliances where they greatly enhance the degree of thermal insulation within the cabinet of the appliance. Such panels must remain effective for the life of the appliance, generally a period in excess of 20 years. To do so, the panels must be highly gas impervious, yet must be able to prevent transmission of heat not solely by conduction and radiation through the panels, but also by conduction around the surfaces of the panels. Further, any gases and vapors that do permeate the panel walls in excess of what is tolerable, depending on the panel filler insulation material, must be absorbed or otherwise captured to prevent degradation of the panels which, for insulation purposes, are most effective only when the interiors of the respective panels are evacuated to a very low pressure by removal of nearly all gases and vapors (the desired vacuum level depends on the specific filler insulation material).

U.S. Pat. No. 5,018,328 entitled "MULTI-COMPARTMENT VACUUM INSULATION PANELS", assigned to the assignee of the present application, and incorporated herein by reference, discloses the use of a multi-compartment vacuum insulation panel. This panel utilizes multiple compartments to enhance the long term thermal characteristics of the panel by "protecting", the vacuum characteristics of at least one of the compartments by surrounding with additional evacuated compartments. Further, strategic placing of gettering materials is disclosed such that gettering material absorbing certain gases can be placed in the outer compartments and other gettering materials absorbing different gases can be placed in the internal compartments to enhance the lifetime of the panel.

U.S. Pat. No. 5,091,233 entitled "GETTER STRUCTURE FOR VACUUM INSULATION PANELS" also assigned to the assignee of the present application and incorporated herein by reference, discloses a handleable getter structure which permits the getter to be handled in open atmosphere for relatively short periods of time, yet provides prolonged gettering action over relatively long periods of time when used in a sealed compartment.

U.S. Pat. Nos. 4,000,246 and 4,938,667 disclose methods for evacuating compartments through the use of gettering material provided within the compartment. U.S. Pat. No. 4,938,667 also discloses the use of glass vials to hold the gettering material to prevent it from being exposed prematurely. Crushing of the glass vials will expose the gettering material at an appropriate time. However, such an arrangement is not useful within a vacuum insulation panel which typically has relatively thin plastic or foil walls which are susceptible to rupturing upon contact with broken glass.

U.S. Pat. No. 4,668,551 discloses a vacuum insulation panel having a single evacuated compartment filled with an insulating material and including two separately packaged getters to be contained within the evacuated compartment, one for absorbing carbon dioxide and the other for adsorbing freon gas.

U.S. Pat. No. 4,444,821 discloses a vacuum insulation panel which is filled with an insulating material and which also is provided with a combination of getter materials such as barium and zeolite for removing various gases from within the vacuum panel. It is disclosed that if both types of getters are employed as gettering materials within the vacuum insulating panel, it is preferred that they be disposed in different locations therein.

Thus, in known gettering systems, getters must be isolated from each other by being placed in separate compartments or else physically separated apart in a single compartment. However, even the physical separation will not prevent one of the getters from being consumed by gases or vapors to be absorbed by the second getter. These types of arrangements add to the time and cost involved in manufacture of vacuum insulating panels.

SUMMARY OF THE INVENTION

The present invention provides for a gettering system which contemplates the use of more than one type of getter for removing different gases within an enclosed compartment, and which also maximizes the use of each getter for removing specific gases and prevents each getter from being consumed by gases to be removed by other getter(s).

The invention also provides for a gettering system and package which can be handled during a manufacturing process in such a way so that the gettering materials are not contaminated during manufacture of a compartment which is to remain evacuated, yet which would not require overly burdensome or expensive procedures in order to safeguard the gettering system.

The present invention also provides for a gettering system, with activated getters in a package, which can be used in a vacuum panel comprised of one or more flexible film walls which will not cause damage to the walls in order to achieve activation of the gettering system.

The present invention also provides a gettering system which is useful in a single or multiple compartment vacuum panel in which a single getter package is provided with multiple getters therein, arranged in such a fashion so as to minimize the cost of the gettering package, yet maximize the removal of gases over the expected 20 year life of the vacuum panel.

The invention provides for a getter system of multiple getters in which the individual getters are packaged and arranged so that typically only those gases to be removed by a particular getter are permitted access to such getter so as to prevent a particular getter from being depleted by gases which should be removed by a different getter.

For example, water vapor is most economically removed by a desiccant such as $CaSO_4$, $CaO$, $BaO$, $MgClO_4$ etc. and other gases such as organic vapors or permanent gases such as $O_2$, $N_2$, $CO_2$, $CO$ are removed by reactive metals such as barium, zirconium and alloys of such metals with other elements and other pyrophoric group 1 or group 2 metals and their alloys. Such reactive metals also easily combine with water vapor, however, the reactive metals are much more expensive and could readily be consumed by water vapor if not "protected".

Thus, a system is provided in which certain gases, such as water vapor, are absorbed by a getter such as a desiccant and the other getter, such as a reactive metal, is arranged and protected such that the water vapor is not permitted to get to the second getter, but only the gases which are most effectively and economically removed by the reactive metal getter. The protected second getter would already be in an activated form prior to its insertion into the panel. Thus, no further heat needs to be applied to the panel to activate the getter material. This is particularly important in environments such as a vacuum insulation panel which has barrier walls made from flexible films and foils which may not be able to withstand high temperatures, such as above 200° F. Typically activation temperatures for getters are above 200° F. Preferably the getter package, including the desiccant, is capable of being handled in an outside atmosphere for a brief period of time (measured in minutes) without detrimentally affecting the getters' ability to sorb the appropriate gases.

For example, a single package may be provided in which a reactive metal is contained within an inner chamber of the package while a separate chamber of the package has a desiccant. An outer package material is provided which will allow gases to transmit into the interior where the water vapor will be intercepted by the desiccant. The desiccant is isolated from the reactive metal getter by a barrier which permits transmission of the gases, other than water vapor, to be removed by the reactive metal. Other types of packages may be provided which allow the gases to only flow through one of two sides of the package, with the permeable side being backed completely by the desiccant. Only after gases have flowed through the desiccant will they reach the reactive metal.

The desiccants themselves can be arranged in layers, in that some desiccants are lower in cost and higher in absorption capacity, yet are lower in vapor pressure than other desiccants. For example, CaO is much less expensive than BaO and has about three times more capacity for water than BaO. However, CaO has a somewhat higher HO vapor pressure than BaO and, in cases where extremely good protection is needed, a small layer of BaO can be interposed between the CaO and the reactive metal.

Other types of getter systems may be used for removing various gases. For example, iron may be used to remove $CO_2$ and $O_2$, however, for such reactions to occur, HO is required. Thus, the getter system would need to be arranged such that the gases first pass through a layer of iron so that the HO is available to permit the reaction with $CO_2$, $O_2$ and then the $H_2O$ along with other gases such as $N_2$ will proceed through a layer of a desiccant where the HO is removed allowing only the $N_2$ to pass into the reactive metal getter.

BRIEF DESCRIPTION OF THE DRAWINGS

FIG. 7 is plan view of an embodiment of a gas getter package embodying the principles of the present invention.

FIG. 8 is a side sectional view taken generally along the line VIII—VIII of FIG. 7.

FIG. 9 is a side sectional view of an embodiment of a vacuum insulation panel embodying the principles of the present invention.

FIG. 10 is a side sectional view of an embodiment of a vacuum insulation panel embodying the principles of the present invention.

FIG. 11 is a side sectional view of an embodiment of a vacuum insulation panel embodying the principles of the present invention.

DETAILED DESCRIPTION OF THE PREFERRED EMBODIMENTS

Although the gas getter system of the present invention can be used in a wide variety of environments to remove selected gases from an enclosed space or compartment, the getter system finds particular utility in a vacuum insulation panel. Such vacuum insulation panels can also be used in a wide variety of environments to prevent transfer of heat from a relatively hot area to a relatively cold area, however, the panels find particular utility in a refrigeration appliance, and therefore, to the extent that this invention is described in a particular environment, it will be in a refrigeration appliance. However, it should be understood that the invention is not limited to such use.

Figure 1:
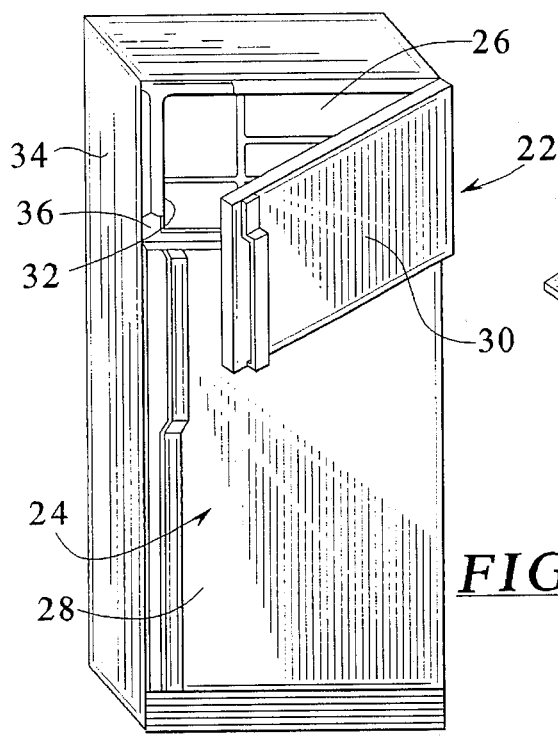
FIG. 1 is a perspective view of a refrigeration appliance illustrating the use of a vacuum thermal insulation panel embodying the principles of the present invention.

In FIG. 1 there is illustrated a refrigeration appliance generally at 22 which comprises a refrigerator compartment 24 and a freezer compartment 26 located above the refrigerator compartment 24. Of course, other refrigeration appliances, such as those having only a refrigerator compartment or only a freezer compartment or different arrangements of refrigerator and freezer compartments, could employ the present invention. The particular refrigeration appliance illustrated is only a single example of a type of refrigeration appliance that could utilize the present invention. Otherwise environments having a hot side and a cold side could also benefit from the use of the present invention when used in a vacuum insulation panel.

Figure 2:
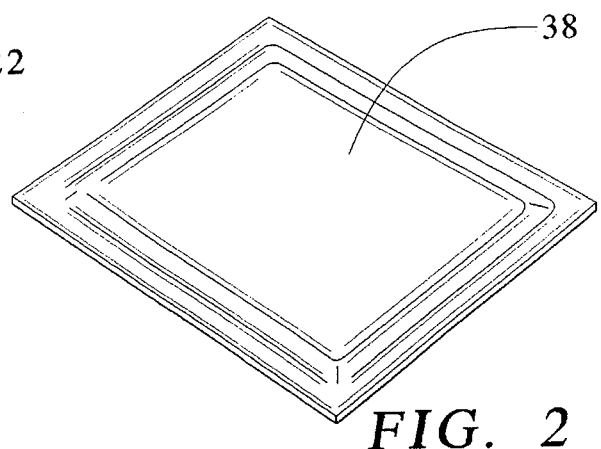
FIG. 2 is a perspective view of a vacuum insulation panel embodying the principles of the present invention.

Each of the refrigerator and freezer compartments 24, 26 is accessed by means of a separate door 28, 30. The compartments are defined by an interior liner wall 32 which is spaced within an exterior outer shell 34, comprising the refrigeration appliance cabinet. A space 36 between the liner and the shell is normally filled with an insulation material which might include a polyurethane foam injected into the space 36 in a liquid state where it expands and hardens into a porous solid state to form a structural part of the cabinet as well as providing a thermal barrier necessary to prevent rapid warming of the interior refrigerator and freezer compartments 24, 26. The present invention provides an improved vacuum insulation panel 38 (FIG. 2) which is to be inserted in the space 36 between the liner 32 and the shell 34 to enhance the insulation property of the insulation systems. Polyurethane foam may also be used in the insulation system to provide additional insulation, the structural support it normally provides and to assist in holding the panels 38 in place between the walls 32, 34.

The particular placing and usage of such vacuum panels may be that such as disclosed in U.S. Pat. No. 5,082,335 entitled "VACUUM INSULATION SYSTEM FOR INSULATING REFRIGERATION CABINETS", assigned to the same assignee as the present invention, and incorporated herein by reference.

In order to develop and keep a vacuum insulation panel at full efficiency for many years, a gas pumping system, such as a chemical pump, must be in place to remove gases or vapors that may penetrate the outer wrapper of the vacuum insulation package or other gases or vapors which may outgas from the vacuum insulation filler. Also, the packaging itself might outgas various organic vapors. Water vapor is a likely penetrant that will cause damage to the vacuum. Air components must also be absorbed for highest efficiency. Relatively expensive reactive metals are often used for this purpose. However, moisture can be easily removed by the use of quite inexpensive desiccant material such as anhydrous calcium sulfate, calcium oxide or barium oxide. Organic vapors can be intercepted by activated carbon. In order to take advantage of the high cost reactive metals, a design must be used to prevent premature permanent moisture uptake or organic vapor uptake by the expensive reactive metal.

Reactive metals such as barium, zirconium and other pyrophoric metals and alloys of such metals with other elements (getters) are used for removing small amounts of $O_2$, $N_2$, $CO_2$, CO and $H_2O$ from an evacuated space. Desiccants such as $CaSO_4$, $MgClO_4$, CaO and BaO are much more economically useful for removing moisture than the metals. The present invention utilizes a package to isolate the expensive reactive metal from moisture and perhaps organic vapors by an effective desiccant, optionally activated carbon, and special packaging. The invention also allows the getter package to be handled for short periods of times in the ambient atmosphere without exhausting either the desiccant or the reactive metal getter. Preferably the getter package does not require heat activation after insertion into the vacuum insulation panel.

Figure 3:
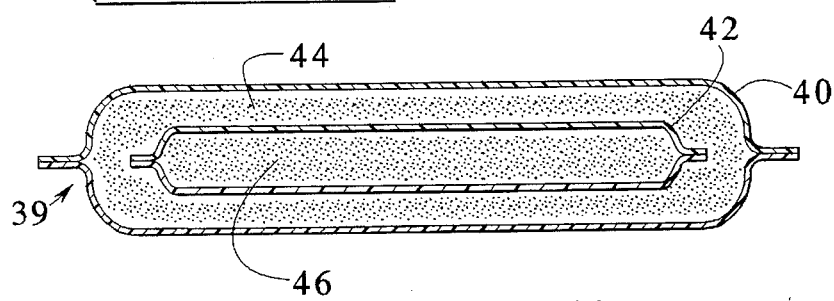
FIG. 3 is a side sectional view of an embodiment of a gas getter package embodying the principles of the present invention.

One configuration for such a package is a pouch in a pouch such as shown at 39 in FIG. 3. That is, there is an outer pouch 40 and an inner pouch 42, each defining a separate chamber. The pouch materials are designed to allow rapid permeation of air and $CO_2$, but very slow permeation of moisture. The center pouch 42 contains a reactive metal getter while the outer pouch 40 contains a desiccant and, if desired or necessary, activated carbon. The entire package and its contents must be vacuum packaged so that neither the getter nor the desiccant are expired prior to assembly into a vacuum insulation panel or other enclosed compartment which is to be kept free of unwanted gases. Storage before use must either be in an evacuated carrier or an inert gas atmosphere such as argon or helium.

The package can be designed by selecting an appropriate pouch material which can allow short handling periods in air immediately before insertion into the vacuum insulation panel, for example.

The moisture that exists in the vacuum insulation panel, by either outgassing from the contents of the panel, or permeation through the vacuum insulation panel barrier wall, will be intercepted by the desiccant in the outer pouch 40. Air, either residual or that which permeates the vacuum insulation panel, will rapidly permeate into the center pouch 42 and be reacted with the reactive metal getter 46.

Figure 4:
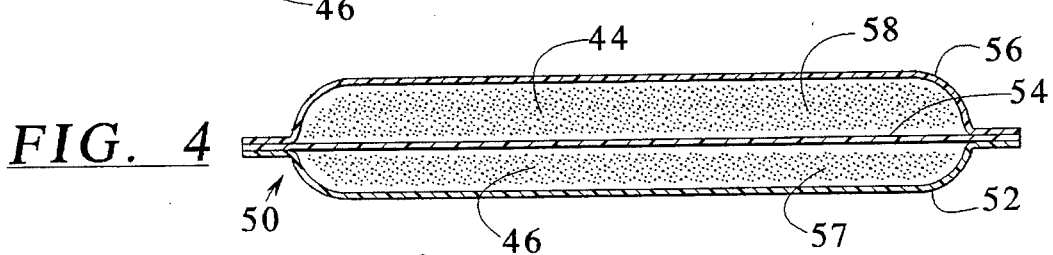
FIG. 4 is a side sectional view of an embodiment of a gas getter package embodying the principles of the present invention.

An alternate design of the packaging is shown in FIG. 4 wherein a package 50 consists of an impermeable foil 52 on one side and two permeable films 54, 56 on the other, all of which are sealed together about their periphery. This type of sandwich construction would have the reactive metal getter 46 positioned in a bottom chamber 57 between the foil 52 and a first film layer 54 and the desiccant 44 in an upper chamber 58 between the two film layers 54, 56. Thus, any gases within the evacuated compartment would permeate into the package 50 only through the film layer 56 to first pass through the desiccant 44 and then through film layer 54 to come in contact with the reactive metal getter 46. In this fashion, the expensive metal getter 46 would be protected by the layer of desiccant 44 in order to avoid the reactive metal getter 46 from being consumed by water vapor.

Figure 5:
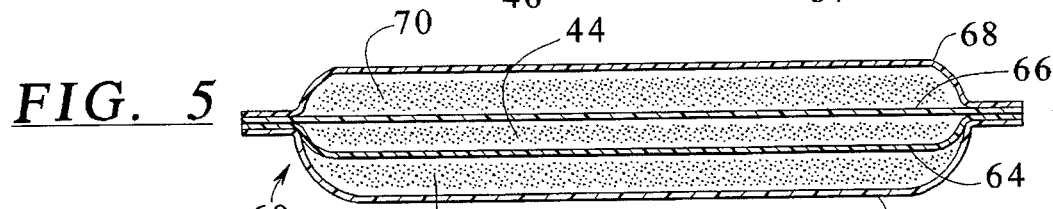
FIG. 5 is a side sectional view of an embodiment of a gas getter package embodying the principles of the present invention.

FIG. 5 shows a further alternate arrangement for a package 60 in which a three layer package is provided. Again, there is a bottom foil layer 62, but in this case, there are three film layers 64, 66 and 68. Again, the reactive metal getter 46 is positioned between the foil 62 and a first film layer 64. The desiccant 44 is positioned between film layers 64 and 66 while another material, in this case iron 70, is positioned between film layers 66 and 68. This arrangement is provided since iron generally needs moisture for reaction to remove oxygen and $CO_2$. Thus, the outermost chamber defined by layers 66 and 68 would be exposed to the highest pressures of water vapor and oxygen, with the oxygen being removed by the iron getter. The water vapor and nitrogen then pass through film layer 66 where the water vapor would be removed by the desiccant 44 resulting in only the nitrogen passing through film layer 64 to be removed by the reactive metal 46.

Materials which can be used for the films include high density polyethylene, low density polyethylene, PCTFE and FEP, EVA, etc.

Figure 6:
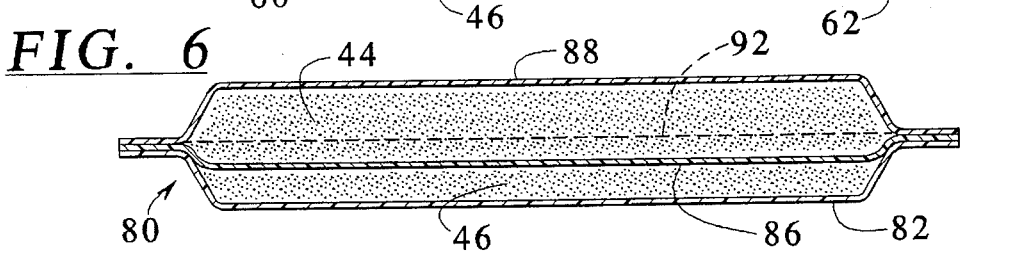
FIG. 6 is a side sectional view of an embodiment of a gas getter package embodying the principles of the present invention.

Another embodiment of a getter package is illustrated at 80 in FIG. 6 where it is seen that there is an outer package 82 which may be an impermeable foil. Contained adjacent to the foil 82 is the reactive metal getter 46 which is covered by a porous material 86, such as paper, non-woven fabric or other thin porous material which is then covered by a large volume of desiccant 44 and, if desired, activated carbon. A porous, non-woven cover 88 is held in place above the desiccant 44 by securing to a periphery of the foil 82 so that the entire package 80 and its contents will remain intact. Non-woven polyethylene fabric is advantageous due to its general ability to seal to the foil layer. The porous material can be used for one or both the material 86 and the cover 88. These must be manufactured and stored in an inert atmosphere such as argon or helium.

The entire package 80 which is already activated is packaged and stored in an inert gas to prevent premature exposure to sorbable gases and vapors. The amount of desiccant 44 to be used can be determined by experimentation and is dependent upon the volume of the space or compartment which is to remain free of water vapor, the nature of the permeability of the overall container which is to have the interior compartment free of water vapor and the expected life for the container. Various types of desiccants can be used including CaO or BaO. CaO is a less expensive material than is BaO and has about three times more capacity for water than BaO. By using a sufficiently large amount of CaO, the entire desiccating requirements of a vacuum insulation panel can be incorporated in a single getter system package 80. However, since CaO has a somewhat higher $H_2O$ vapor pressure than BaO, in cases where extremely good protection of the reactive metal getter 46 is needed, a small layer of BaO 92 may optionally be interposed between the CaO 44 and the reactive metal.

Helium can also be used as a processing atmosphere for the system with permeable films as shown in FIGS. 3–5, since the helium permeates so rapidly when exposed to air that it dissipates by the time the getter package is ready for sealing into a vacuum insulation panel. Combinations of porous separator and permeable cover are also useful, especially if helium is used for packaging. If care is taken not to mix the reactive metal getter with the desiccant, the separator 86 can be eliminated. The use of a porous cover 88 and separator 86 allows the getter system to be manufactured in an inert atmosphere, such as argon, in contrast to the permeable film cover and separator such as described with respect to FIGS. 3, 4 and 5, which must be vacuum packaged. The vacuum packaged, permeable film getter assembly design protects the reactive metal better for longer life.

FIGS. 7 and 8 show another embodiment of a getter system in accordance with the present invention.

In this system there is provided an exterior pouch 100 which is constructed, for example, of a barrier foil 101 or some other superior barrier material which can be used to contain helium and exclude air and moisture from permeating therethrough. The two outer layers of barrier foil 101 will be secured together by heat seal, appropriate adhesives or other known means to prevent any leakage along the seam between the two foil layers. This exterior pouch 100 is used to protect the interior getter system package until the time in the manufacturing process when it is necessary to insert the getter system into the space or compartment which is to remain free of the selected gases. This particular package can also be part of a quality system to detect defects in vacuum insulation panels such as in accordance with the testing procedure disclosed and claimed in U.S. Pat. No. 5,345,814 entitled "METHOD AND APPARATUS FOR TESTING VACUUM INSULATION PANEL QUALITY" assigned to the assignee of the present invention, and incorporated herein by reference.

The prior patent described using a small amount of helium interior of a vacuum insulation panel to determine a leak rate using an ultra sensitive helium detector.

In the getter system of this embodiment there is an innermost chamber 102 which is defined by barrier walls 104, 106 which may be selected from materials which allow very rapid permeation of air and helium and very slow permeation of water vapor. This can be provided by materials such as polyethylene, polypropylene and polymethylpentene. Outer chambers 108 are defined between the barrier layer 106 and another barrier layer 110 and contain a desiccant 44 such as those listed earlier. The barrier wall 110 also would allow rapid permeation of air and helium and very slow permeation of water vapor. In a preferred arrangement, all of the barrier layers are heat sealed or otherwise hermetically sealed together along three sides 112, 114, 116 and only the interior barrier layers 104, 106 and 108 are secured together at 118, while the outermost barriers 101 are secured together along side 120. The center chamber 102 contains the reactive metal getter 46 while the outer chambers 108 contain the desiccant 44. This entire package and the contents are assembled in a helium atmosphere so that none of the reactive metal getter or desiccant are expired. The entire package can be handled in an open atmosphere for significant periods of time due to the protective nature of the outer barrier foil 100. When the package is ready to be used, it can be cut along line 122 to allow gases to be exposed to the barrier walls 110 and the whole package and its contents can be placed into the vacuum insulation panel. The vacuum insulation panel would then be evacuated and sealed.

The helium, due to its high diffusivity, will rapidly escape from the getter/desiccant package. The getter/desiccant package then provides a measured source of helium to the interior of the vacuum insulation panel for later quality auditing. The moisture that exists in the vacuum insulation panel by either outgassing or permeation of the vacuum insulation panel package will be intercepted by the desiccant in the middle chamber 108. Air, either residual or that which permeates the vacuum insulation panel, will rapidly permeate into the inner chamber 102 and be reacted with the reactive metal getter 46.

The present invention can be utilized in different types of vacuum insulation panels, or in vacuum insulation panels having different types of insulation filler. For example, FIG. 9 illustrates a single compartment vacuum insulation panel generally at 200 in which the panel is comprised of a top barrier wall 202 and a bottom barrier wall 204 which may be an ultra high barrier film and/or a flexible foil or other known barriers. Although vacuum insulation panels are made of relatively impermeable packaging materials, they do allow entry of very small amounts of gas and moisture over time. Appropriate fillers for the vacuum insulation panels have high porosity with very small interstitial spaces. Examples of such fillers are fine, open celled, plastic foams, xerogels and aerogels, fine mineral particulates such as diatomite or expanded perlite, glass or other fine fibers, precipitated inorganics such as silica and calcium silicate, fumed silica, etc. The plastic foam is very attractive due to its low cost, good thermal resistance, low density and very easy processing. The vacuum insulation panel 200 of FIG. 4 is shown filled with a filler material 206 comprising an open celled foam. Optionally a foil reflector material or particulate reflectors or opacifiers, such as aluminum flake or carbon black, can be used to reduce transmission of radiation energy through the vacuum insulation panel.

The use of an appropriate getter system of the types described above enables a much wider choice of vacuum insulation panel packaging materials and may obviate the need for multiple compartments. A getter system 210 is positioned within the vacuum insulation panel 200 in a cavity 212 formed in the foam 206. The precise construction of the getter system 210 can be any one of the different types described with respect to FIGS. 7–13 and 10–12.

FIG. 10 illustrates a single compartment vacuum insulation panel at 220 which again is comprised of a first outer wall 222, a second outer wall 224 and contains a microporous filler material 226 which, in this embodiment, is shown as a glass fiber. Again, foil reflectors or particulate opacifiers or reflectors can be used in the glass fibers to reduce passage of radiation energy. A getter system 230 is positioned within a cavity 232 in the glass fiber and can be of any of the types described.

FIG. 11 illustrates another embodiment of a vacuum insulation panel at 240 which includes a first barrier wall 242, a second barrier wall 244 and a microporous filler material 246 such as expanded perlite powder. Again, optionally an opacifier or reflector can be contained within the perlite powder.

A getter system 250 is positioned within the powder 246, although due to the loose nature of the powder during original filling, a separate cavity does not form or need to be preformed.

Figure 12:
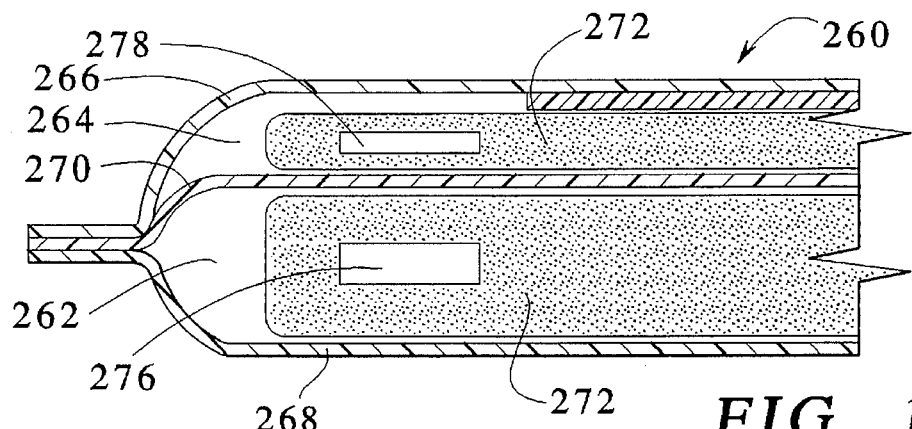
FIG. 12 is a side sectional view of an embodiment of a vacuum insulation panel embodying the principles of the present invention.

Another embodiment of a vacuum insulation panel is partially illustrated in FIG. 12 at 260. In this vacuum insulation panel multiple compartments are provided, in this case a main compartment 262 and a smaller auxiliary compartment 264. Also a second auxiliary compartment could be provided on the side opposite the main compartment 262 from the auxiliary compartment 264 shown as disclosed in U.S. Pat. No. 5,018,328 entitled "MULTI-COMPARTMENT VACUUM INSULATION PANELS". The compartments 262, 264 are formed by a pair of gas impermeable outer film walls 266, 268 and a gas impermeable inner wall 270. A microporous filler insulation material 272 is provided in each of the compartments 262, 264 to support the film walls 266, 268, 270 of the panel when atmospheric gases are evacuated from the interior compartments 262, 264 of the panel. The pressure differential across film wall 270 is very small, while the pressure differential across either of the outer walls 266, 268 will be approximately equal to atmospheric pressure. The two outer walls 266, 268 and the inner wall 270 are hermetically sealed to each other about their outer edges or periphery to define the compartments 262, 264. Various types of barrier wall materials are described in the earlier patents referred to in this specification and incorporated herein by reference including, for example, U.S. Pat. No. 5,018,328. If any of the barrier walls are constructed with a metal foil, then a thermal break should be provided to prevent conductive transfer of heat from one side of the insulation panel to the other.

Positioned within the main compartment 262 is a getter system 276 which can be of any of the types disclosed in this specification in which multiple getter types are utilized to selectively remove various gases and including means for protecting some getters from being consumed by gases which are to be removed by other, less expensive getters. A getter material 278 is also provided in the auxiliary compartment 264 which preferably is a desiccant to first intercept water vapor which permeates through the outer auxiliary compartment and to reduce the amount of water vapor which might permeate into the main compartment 262.

Figure 13:
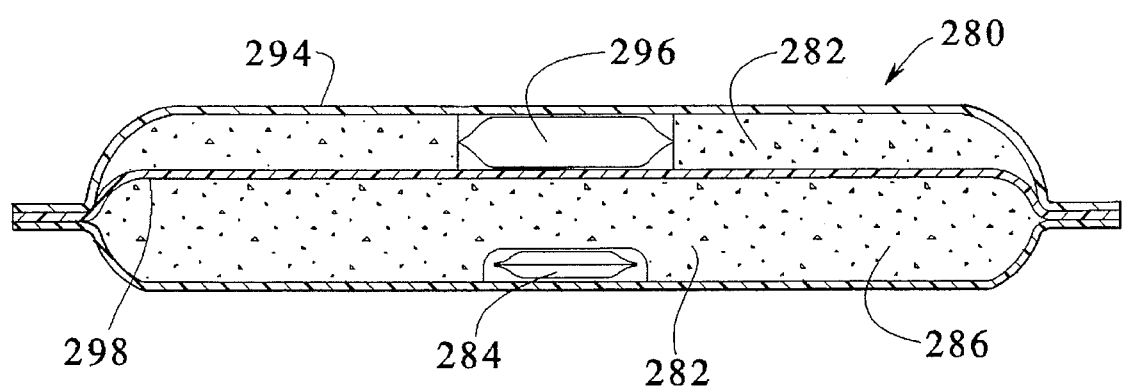
FIG. 13 is a side sectional view of an embodiment of a vacuum insulation panel embodying the principles of the present invention.
Figure 14:
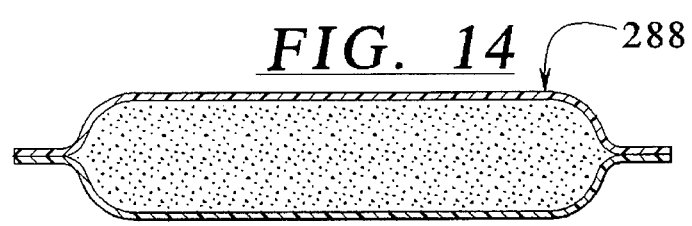
FIG. 14 is a side sectional view of an embodiment of a gas getter package embodying the principles of the present invention.
Figure 15:
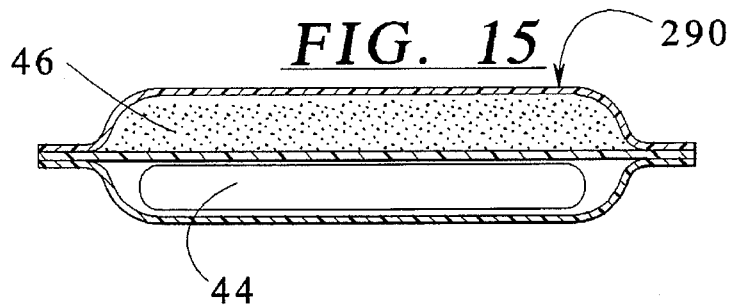
FIG. 15 is a side sectional view of an embodiment of a gas getter package embodying the principles of the present invention.

FIG. 13 illustrates an alternative vacuum insulation panel 280 which again is a multiple compartment panel which has a open celled foam insulation filler material 282 in both compartments. A getter system 284 is provided in a main compartment 286 which can comprise a package as illustrated in FIG. 14 which contains a getter material 288 such as activated carbon which will remove organic vapors which outgas from the foam material. Alternatively, as illustrated in FIG. 15, a getter system 290 may be provided in the form described above in which a reactive metal 44 is "protected" by a layer of other materials such as a desiccant 46 and/or an activated carbon material. In an auxiliary compartment 294 of the vacuum insulation panel 280 shown in FIG. 13 there is provided additional gettering material 296 such as a desiccant to reduce the amount of water vapor passing through a barrier wall 298 into the main compartment 286.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. An evacuated container comprising:
    an outer barrier wall defining a compartment;
    a microporous insulation filler container within said compartment;
    a first getter material contained within said compartment capable of gettering at least a first gas or vapor and a second, different gas or vapor;
    a second getter material also contained within said compartment capable of gettering said first, but not said second, gas or vapor;
    packaging containing said first and second getter materials and excluding said microporous insulation filler, such that said second getter material will be more readily exposed to said first gas or vapor than said first getter material, wherein said first getter material will be more readily exposed to said first gas or vapor than said first getter material, wherein said first getter material will be protected from said first gas or vapor.

2. A getter system according to claim 1, wherein said packaging comprises:
    a first pouch formed of a material that readily passes said second gas or vapor, but does not readily pass said first gas or vapor, receiving said first getter material; and
    a second pouch formed of a material that readily passes said first gas or vapor, receiving said second getter material.

3. A getter system according to claim 2, wherein said first pouch is positioned within an interior of said second pouch.

4. A getter system according to claim 1, wherein said packaging comprises:
    a package having a wall portion impermeable to both said first and second gases or vapors;
    placement of said first getter material adjacent to said wall portion;
    placement of said second getter material over said first getter material so as to prevent any exposure of said first getter material where said first getter material is not in contact with said wall portion; and
    a covering for said package made of a material permeable to both said first and second gases or vapors to prevent said first and second getters from dislodging from said package.

5. A getter system according to claim 1, wherein said packaging comprises:
    a package having a first chamber and a second chamber;
        said first chamber receiving said first getter material and having an outside wall impermeable to said first and second gases or vapors;
        said second chamber receiving said second getter material and having an outside wall permeable to said first and second gases or vapors;
        said first and second chambers being joined along an inside wall which is permeable to said second gas or vapor;
    wherein all of said first and second vapors entering said package must enter through said second chamber.

6. A getter system according to claim 1, wherein said first getter material is a reactive metal or alloy getter and said second getter material is a desiccant, and wherein said first gas or vapor is water vapor and said second gas or vapor is a permanent gas.

7. A getter system according to claim 1, wherein said evacuated container is a vacuum insulation panel.

8. A getter system for use with a container evacuated of gases, but containing a microporous insulation filler comprising:
- a first getter material capable of gettering at least a first gas or vapor and a second, different gas or vapor;
- a second getter material capable of gettering said first, but not said second, gas or vapor;
- packaging containing said first and second getter materials and excluding the microporous insulation filler, such that said first and second getter materials may be placed within a single compartment of said evacuated container and said second getter material will be more readily exposed to said first gas or vapor than said first getter material, wherein said first getter material will be protected from said first gas or vapor,
- wherein said packaging comprises a package having a first chamber and a second chamber;
  - said first chamber receiving said first getter material and having an outside wall impermeable to said first and second gases or vapors;
  - said second chamber receiving said second getter material and having an outside wall permeable to said first and second gases or vapors;
  - said first and second chambers being joined along an inside wall which is permeable to said second gas or vapor and is impermeable to said first gas or vapor;
- wherein all of said first and second vapors entering said package must enter through said second chamber.

9. A getter system for use with an evacuated container comprising:
- a first getter material capable of gettering at least a first gas or vapor and a second, different gas or vapor;
- a second getter material capable of gettering said first, but not said second, gas or vapor;
- packaging for said first and second getter materials, such that said first and second getter materials may be placed within a single compartment of said evacuated container and said second getter material will be more readily exposed to said first gas or vapor than said first getter material, wherein said first getter material will be protected from said first gas or vapor;
- said first getter material also being capable of gettering at least a third, different gas or vapor;
- a third getter material capable of gettering at least said third gas or vapor, but not said first or second gas or vapor;
- said packaging also packaging said third getter, such that said first, second and third getter materials may be placed together within said single compartment of said evacuated container and said third getter material will be more readily exposed to said third gas or vapor than said first or second getter materials.

10. A getter system according to claim 9, wherein said third getter material is iron and said third gas or vapor is oxygen.

11. A getter system for use with a container evacuated of gases, but containing a microporous insulation filler comprising:
- a first getter material capable of gettering at least a first gas or vapor and a second, different gas or vapor;
- a second getter material capable of gettering said first, but not said second, gas or vapor;
- packaging containing said first and second getter materials and excluding the microporous insulation filler, such that said first and second getter materials may be placed within a single compartment of said evacuated container and said second getter material will be more readily exposed to said first gas or vapor than said first getter material, wherein said first getter material will be protected from said first gas or vapor,
- wherein said first getter material is a reactive metal or alloy getter and said second getter material is a combination of desiccant and activated carbon, and wherein said first gas or vapor is an organic gas and said second gas or vapor is a permanent gas.

12. A vacuum insulation panel comprising:
- a flexible material outer barrier wall defining a compartment;
- a microporous insulation filler contained within said compartment;
- a first getter material contained within said compartment capable of gettering at least a first gas or vapor and a second, different gas or vapor;
- a second getter material also contained within said compartment capable of gettering said first, but not said second, gas or vapor;
- packaging containing said first and second getter materials and excluding said microporous insulation filler, such that said second getter material will be more readily exposed to said first gas or vapor than said first getter material, wherein said first getter material will be protected from said first gas or vapor.

* * * * *